United States Patent [19]

Corsini

[11] Patent Number: 4,930,339
[45] Date of Patent: Jun. 5, 1990

[54] TABLE WITH ADJUSTABLE CONVEXITY FOR A PRESS BRAKE, BED OR THE LIKE

[75] Inventor: Florent Corsini, Chassieu, France

[73] Assignee: Ets A. Colly, Villeurbanne, France

[21] Appl. No.: 353,551

[22] Filed: May 18, 1989

[30] Foreign Application Priority Data

Feb. 5, 1988 [FR] France .................................. 88 01815

[51] Int. Cl.$^5$ ............................................. B21D 5/02
[52] U.S. Cl. ........................................ 72/482; 72/389; 72/446
[58] Field of Search .................. 72/389, 446, 448, 462, 72/386, 482

[56] References Cited

U.S. PATENT DOCUMENTS

| | | | |
|---|---|---|---|
| 4,106,323 | 8/1978 | Haenni et al. | 72/448 |
| 4,347,727 | 9/1982 | Galiger | 72/389 |
| 4,426,873 | 1/1984 | Pearson et al. | 72/389 |
| 4,586,361 | 5/1986 | Reinhorn et al. | 72/389 |
| 4,732,032 | 3/1988 | Kogure | 72/389 |
| 4,736,612 | 4/1988 | Russell | 72/389 |

FOREIGN PATENT DOCUMENTS 0225818 12/1984 Japan .................................. 72/389

*Primary Examiner*—David Jones
*Attorney, Agent, or Firm*—Oliff & Berridge

[57] ABSTRACT

A table is composed of two superimposed horizontal plates braced by two superimposed rows of blocks forming wedges associated pairwise. Blocks of a lower row are linked to the upper face of a lower plate which is itself linked to a fixed base of the machine. Blocks of an upper row are linked to the lower face of an upper plate. The faces in contact of each pair of blocks form a fixed angle with the horizontal. Each block of each pair has an essentially semi-cylindrical shape whose generatrices are oriented transversely with respect to the direction of displacement of the movable upper plate. Each of the blocks is located in a cradle of complementary shape formed, respectively, in the upper face of the fixed lower plate and in the lower face of the movable upper plate. Structure is provded to modify and fixed at will the angular position of each block of the lower row independently of the other blocks in the same row.

12 Claims, 2 Drawing Sheets

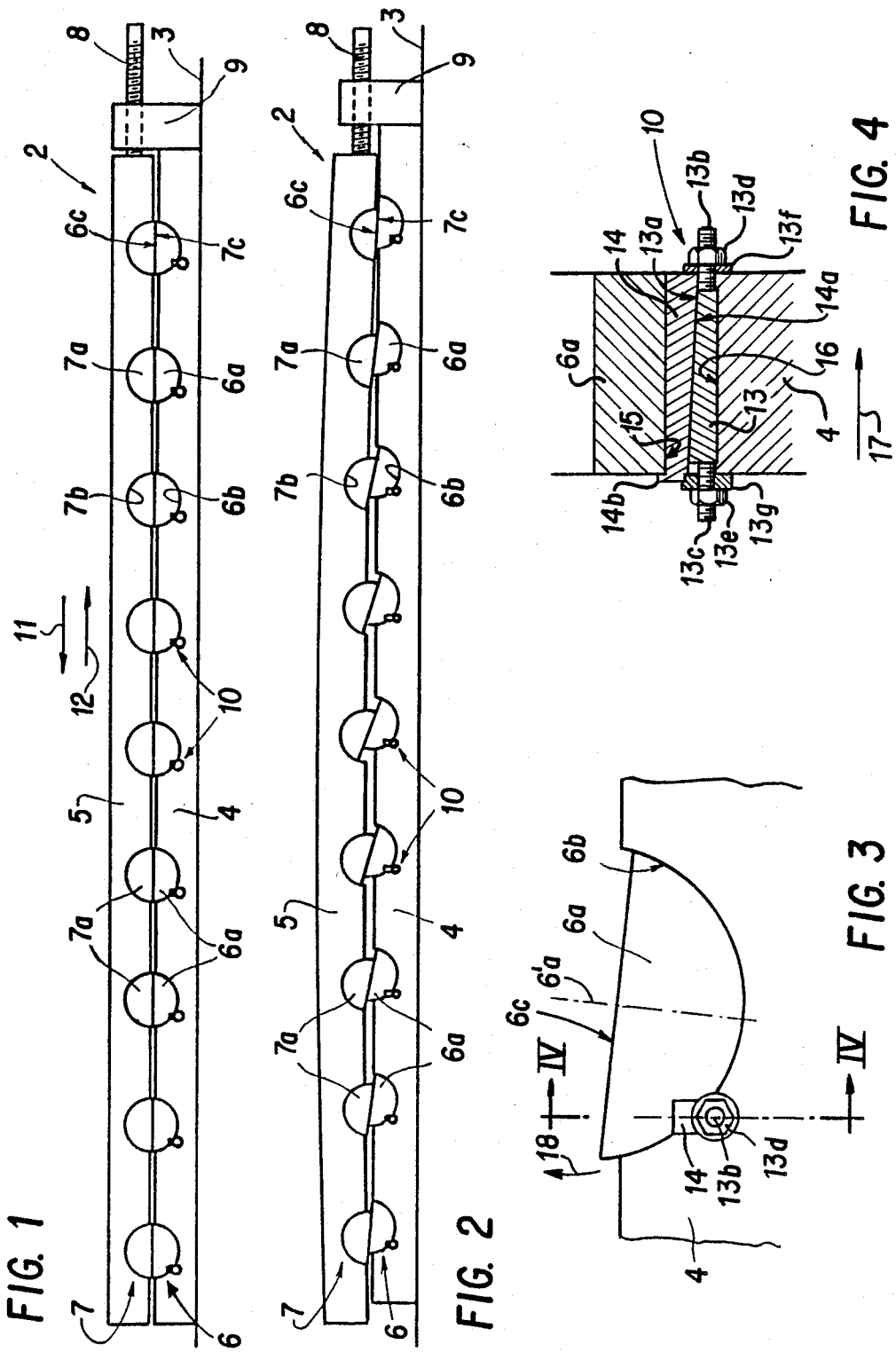

TABLE WITH ADJUSTABLE CONVEXITY FOR A PRESS BRAKE, BED OR THE LIKE

TECHNICAL FIELD

The present invention relates to a table with adjustable convexity for a press brake, bed, or the like.

BACKGROUND

Press brake tables or the like often have machining defects which must be corrected by controlled deformation. It is also known that the very high forces to which these tables are subjected during a sheet-metal bending operation or the like cause additional deformation whose maximum amplitude obviously occures at the center of the table, i.e. in the area furthest from the columns that support it, and depends on the characteristics of the bending performed as well as the nature and thickness of the sheet to be bent.

To allow their users to correct this type of deformation, these tables are often equipped with means permitting them to be deformed in the opposite direction while conferring on them a degree of convexity whose magnitude depends on the characteristics of the bending to be performed and the nature of the sheet to be bent as well as on any machining defects.

Known tables with adjustable convexity with which certain press brakes are equipped are generally composed of two superimposed horizontal plates, braced by two superimposed rows of blocks forming wedges associated pair-wise. The blocks in the bottom row are linked to the upper face of the lower plate which in turn is connected to the fixed base of the machine. Those in the upper row are linked to the lower face of the upper plate. The faces in contact of each pair of blocks form with the horizontal a specific non-zero angle. Mechanical, electrical, pneumatic, hydraulic, or other means are provided to allow the movable upper plate to be shifted from one extreme starting position in a direction in which, by sliding on the lower blocks, the upper blocks and consequently the upper plate are displaced upward.

The convexity of this table in therefore adjusted simply by shifting the movable upper plate relative to the fixed lower plate so that the blocks in the upper row slide on those in the lower row, with the slopes of the faces of the blocks in contact having the effect of conferring a certain convexity on the upper face of the upper plate.

In these known tables, the slope angle of the faces in contact of each pair of blocks is constant and invariable, and the deformation which can be conferred on the upper plate is therefore linear and fixed since it is determined by the aforesaid slopes. Consequently, the shape of this deformation can be changed only by replacing one or more pairs of blocks by blocks with different slopes, which obviously necessitates complete disassembly and reassembly of the table.

SUMMARY OF THE INVENTION

The goal of the present invention is to overcome these drawbacks. For this purpose, in the table with adjustable convexity which it, concerns and which is of the above type, each block of each pair has an essentially semicylindrical shape whose generatrices are oriented transversely to the direction of displacement of the moveable upper plate. Each of the blocks is located in a cradle of complementary shape provided in the upper face of the fixed lower plate and in the lower face of the movable upper plate, respectively. Means are provided to change and fix at will the angular position of each block in the lower row, independently of the other blocks in this same row.

This arrangement thus permits infinite adjustment and modification of the convexity of the table by conferring on it, especially, an irregular deformation serving not only for connections of machine defects but also for compensation of irregular deformations to which it must be subjected, especially if it supports several workstations.

Upon displacement of the movable upper plate, after adjustment of the angular positions of each of the blocks in the lower row, the blocks in the upper row will orient themselves automatically as a result of their being pressed against the blocks in the lower row.

BRIEF DESCRIPTION OF THE DRAWINGS

The invention will be understood from the following description with reference to the attached schematic diagrams which show, as a non-limiting example, one embodiment of the inventive table:

FIG. 1 is a front elevation of a table of the invention before adjustment of convexity;

FIG. 2 is a view similar to FIG. 1 showing the same table after adjustment of its convexity;

FIG. 3 shows, on an enlarged scale, a partial view in a front elevation showing the fit of a block in the lower row in its cradle;

FIG. 4 is a cross section along line IV—IV of FIG. 3;

DETAILED DESCRIPTION OF PREFERRED EMBODIMENTS

Figure 5:
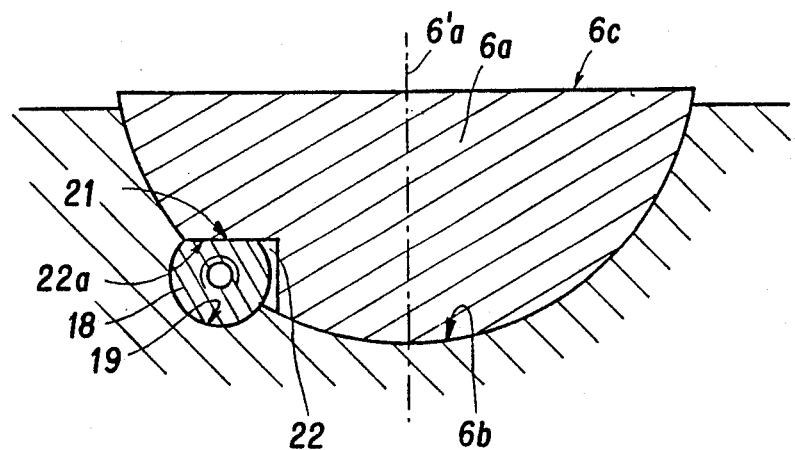
FIG. 5 is a view similar to FIG. 3 showing an improved embodiment of means for changing the angular position of each block in the lower row.

According to one simple embodiment of the invention, the means for changing at will the angular positions of each of the blocks in the lower row are composed of keys. The keys have one face inclined relative to the horizontal and forming a wedge, disposed between the block and its cradle, in a sector offset relative to the plane of symmetry of the block and its cradle, in a direction opposite to that corresponding to the starting position of the movable plate in which the cradles of the blocks in the two rows are located opposite one another. Means are provided for shifting this key axially, thus causing gradual tilting of the associated block and allowing it to be fixed in any desired position.

For example, this key comprises two superimposed parts forming wedges and accommodated partially in a first groove formed longitudinally in the cylindrical face of the lower block in question and in a second groove formed opposite the first in the cradle of this block. The upper part of this key is linked axially to the block. Its lower part, which is accommodated in the second groove formed in the cradle, i.e. in the fixed lower plate of the table, is equipped with means allowing it to be displaced longitudinally relative to this cradle and consequently relative to the upper part associated therewith and to fix it in any chosen position corresponding to the desired tilting of this block to the desired slope.

According to one embodiment of the invention, the inclined face of this wedge-shaped key is in contact with a surface with the opposite slope formed in the corresponding sector of the block or cradle.

Perferably the key is substantially with a substantially circular cross section and is disposed in a partly complementary groove formed in its cradle, and has an inclined plane face constituted by a flat surface external to the groove and in contact with a plane face formed with a reverse slope in the corresponding sector of the block.

With this arrangement, the key can pivot around its axis and its flat surface can follow the inclination of that of the block when the latter is caused to pivot.

Advantageously, the means to shift this key axially are composed of a screw locked axially and engaging a threaded hole provided in the key to receive it.

The drawings show a table 2 which can be a press brake table or other machine tool, whose supporting base is represented only by its upper horizontal surface 3.

As in the case of known tables with adjustable convexity, this table 2 is composed of two horizontal plates, i.e. a fixed lower plate 4 connected to the upper surface 3 of the base and a movable upper plate 5 resting on lower plate 4 through the intermediary of two superimposed rows 6 and 7 of blocks forming wedges and associated pairwise. Means such as a mechanical jack 8 abutting upper face 3 of the fixed base through the intermediary of a column 9 allow movable upper plate 5 to be displaced in two opposite directions as indicated by arrows 11 and 12, i.e. in the direction of rows of blocks 6 and 7.

According to the invention, as the drawing shows, each block 6a in lower row 6 is composed of a semicylindrical part accommodated in a cradle 6b of complementary shape, formed in the upper face of fixed lower plate 4. Each block 7a of upper row 7 is composed of a semicylindrical part with the same radius as blocks 6a in lower row 6, accommodated in a cradle 7b of complementary shape, formed in the lower face of movable upper plate 5. Cradles 6b and 7b of blocks 6a and 7a of a given pair are formed so as to coincide when movable upper plate 5 is in its extreme pre-adjustment position, i.e. the case in which the table has no convexity, as shown in FIG. 1. It is obviously evident that in this position of movable upper plate 5, blocks 6a of lower row 6 can pivot around their longitudinal axes in their cradles 6b without causing any elevation and consequently any deformation of movable upper plate 5. Note also that in the pre-adjustment position, each block 6a in lower row 6 is positioned so that its diametral plane 6c, on which block 7a in upper row 7 associated with it rests by means of its diametral plane 7c, is horizontal as shown in FIG. 1.

Each block 6a in lower row 6 has associated with it means 10 permitting modification and fixing of its angular position by simply pivoting in its cradle 6b. In the example shown in the drawing and especially in FIGS. 3 and 4, these means 10 comprise a key with two superimposed parts in the shape of wedges, i.e. a lower part 13 and an upper part 14. This key is accommodated partially in a first groove 15 formed in the part of the cylindrical wall of the lower block 6a and in a second groove 16 formed in cradle 6b of this block, opposite first groove 15. These two grooves 15 and 16 are positioned so they can be shifted relative to the plane of symmetry 6'a of corresponding block 6a, in the direction indicated by arrow 11 corresponding to a displacement of movable upper plate 5 so as to increase the convexity of table 2.

The two parts of each key rest against one another by their sloping faces, 13a and 14a respectively. Any axial displacement of lower part 13 in the direction of arrow 17 causes elevation of upper part 14 and consequently a pivoting of lower block 6a in the direction of arrow 18. This pivoting causes tilting of its diametral plane 6c and consequently the formation of a slope capable of causing elevation of associated block 7a when movable upper plate 5 is displaced in the direction of arrow 11.

In this example, each upper part 14 of a key 10 is locked axially relative to block 6a with which it is associated by contact with a shoulder 14b, with which its thinnest end is provided, against the corresponding end face of block 6a. Each lower part 13 of keys 10 is provided at each end with a threaded connector 13b, 13c on each of which is mounted a nut 13d, 13e designed to abut, through the intermediary of a washer 13f, 13g, the corresponding end face of cradle 6b block 6a. By screwing and unscrewing nuts 13d and 13e appropriately, it is possible to shift lower part 13 of key 10 axially by increasing its total thickness through the interplay between the slopes formed by contact faces 13a and 14a and consequently to tilt block 6a to the desired angle.

The convexity of this table is therefore adjusted as follows:

With movable upper plate 5 in its pre-adjustment position as shown in FIG. 1 and with each pair of associated blocks 6a,7a positioned with their diametral contact planes 6c, 7c in the horizontal position, it is sufficient to pivot each lower block 6a by desired angle in turn by moving lower part 13 of its key in the direction of arrow 17. The pivoting of each lower block 6a is accompanied by a corresponding pivoting of upper block 7a associated therewith.

The pivot angle of each lower block 6a is independent of that of the other blocks and can therefore be determined at will by the operator, especially as a function of the desired deformation of table 2. When all the lower blocks 6a have been adjusted individually to occupy the desired angular positions, jack 8 is operated to shift upper plate 5 in the direction of arrow 11, which has the effect of shifting upward all of blocks 7a in upper row 7. The magnitude of this displacement depends on the slope presented by their diametral contact faces 6c, 7c and the travel executed by movable upper plate 5.

It is easy to see that these means for adjusting the convexity of table 2 make it poaaible to confer on the table any irregular profile, since each pair of blocks 6a, 7a can be positioned angularly independently of the others.

Figure 6:
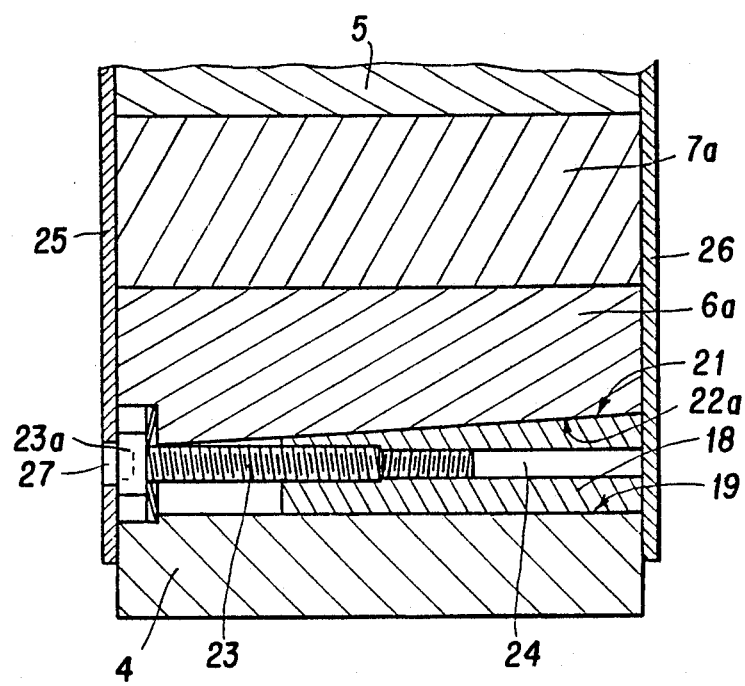
FIG. 6 is a cross section along line IV—IV of FIG. 5.

In the example shown in FIGS. 5 and 6, the means for adjusting at will the angular position of each block 6a in lower row 6 are composed of a one-piece key 18, with cylindrical cross section, accommodated in a groove 19 with a partly cylindrical section with the same radius as key 18, with an axis parallel to that of key 18 and of its cradle 6b, said groove being formed in cradle 6b of said block. Groove 19 is offset relative to the plane of symmetry 6'a of block 6a and its cradle 6b in the same way as groove 16 which accommodates the key with two parts 13 and 14 in the example shown in FIGS. 3 and 4.

The outside wall of key 18 has a flat surface 21 inclined relative to its axis and consequently relative to the generatrices of cradle 6a located entirely outside groove 19. The cylindrical sector of block 6a located opposite groove 19 when contact face 6c of said block 6a is horizontal has a groove 22 with an essentially triangular section. One wall 22a of this groove 22, designed to be in contact with flat surface 21 of key 18, has a slope opposite to that of flat surface 21.

By axially displacing key 18, it is possible to cause block 6a to pivot in its cradle 6b so as to confer the desired inclination on its contact face 6c.

After block 6a pivots in its cradle 6b, face 22a of its groove 22 pivots through the same angle as its contact face 6c without adversely affecting its contact with flat surface 21 of key 18. The cylindrical shape of key 18 allows it to pivot in its groove 19 so that flat surface 21 can follow the gradual tilting of face 22a of groove 22.

As FIG. 6 shows, the means for axially displacing key 18 are composed of a screw 23 engaging a threaded hole 24 in key 18 and immobilized axially by its head 23a abutting fixed lower plate 4.

In this example, plates 25 and 26, attached to fixed lower plate 4 and extending vertically up to movable upper plate 5 ensure axial immobilization of all blocks 6a and 7a of lower and upper rows 6 and 7, respectively.

FIG. 6 shows how a hole 27 made in plate 25 provides access to head 23a of screw 23 to turn it, said head in this example being of the Allen head type.

I claim
1. A table with adjustable convexity, comprising:
a substantially horizontal upper plate;
a substantially horizontal lower plate;
a row of upper blocks superimposed on lower blocks forming pairs of wedges with opposing surfaces between said upper plate and said lower plate;
means for independently adjusting angular slopes of the opposing surface of each said pair of wedges independently of the opposing surfaces of each other said pair of wedges; and
means for shifting one said plate relative to the other said plate in a first direction which causes said upper blocks to shift vertically relative to said lower blocks and causes changes in convexity of said upper plate as a function of said independently adjusted angular slopes;
wherein each said upper block and each said lower block has a substantially semicylindrical shape whose generatrices are oriented transversely to said first direction.

2. A table according to claim 1, wherein said upper plate has a lower surface which includes upper cradles of a shape which is complementary to said substantially semi-cylindrical shape of said upper blocks, and said lower plate has an upper surface which includes lower cradles of a shape which is complementary to said substantially semi-cylindrical shape of said lower blocks.

3. A table according to claim 2, wherin said adjusting means comprises a key interposed betwen each said lower block and an associated lower cradle in a sector offset in said first direction relative to a plane of symmetry of said lower block and said associated lower cradle.

4. A table according to claim 3, wherein said key has an axially face which is inclined relative to an axis of said key to form a wedge shape, and said adjusting means further comprises means for shifting at least one portion of said key axially and means for fixing said at least one portion of said key in a shifted position.

5. A table according to claim 4, wherein said key comprises a first key portion and a second key portion, in the form of superimposed wedges, said first key portion being axially fixed relative to said block, and said second key portion being axially movable relative to said block.

6. A table according to claim 5, wherein said first key portion is accommodated in a first groove formed longitudinally in said lower block, and said second key portion is accomodated in a second groove formed in said lower plate opposite said first groove.

7. A table according to claim 5, wherin said first key portion comprises a shoulder which abuts against an end face of said block to axially fix said first key relative to said block, said shoulder being at a thinnest end of said wedge-shape of said first key portion.

8. A table according to claim 5, wherein said second key portion has two ends, and each said end includes an externally threaded portion which is mounted in an intrenally threaded receiver configured to abut corresponding ends of said lower cradle.

9. A table according to claim 8, wherein each said receiver comprises a nut and a washer.

10. A table according to claim 4, wherein said inclined face of said key abuts an oppositely inclined aurface of said block.

11. A table according to cliam 10, wherein said key is substantially cylindrical and said inclined face of said key is flat, said key is accomodated within a partially complementary groove in said lower cradle, and said inclined surface of said block is flat.

12. A table according to claim 11, wherein said shifting means comprises a screw which is axially fixed relative to said block and said cradle, and a threaded hole in said key which is in threaded engagement with said screw.

* * * * *